Oct. 21, 1952  H. A. ITTEL  2,614,286
ANIMAL CARCASS DEHAIRING MACHINE
Original Filed Jan. 26, 1949  2 SHEETS—SHEET 1
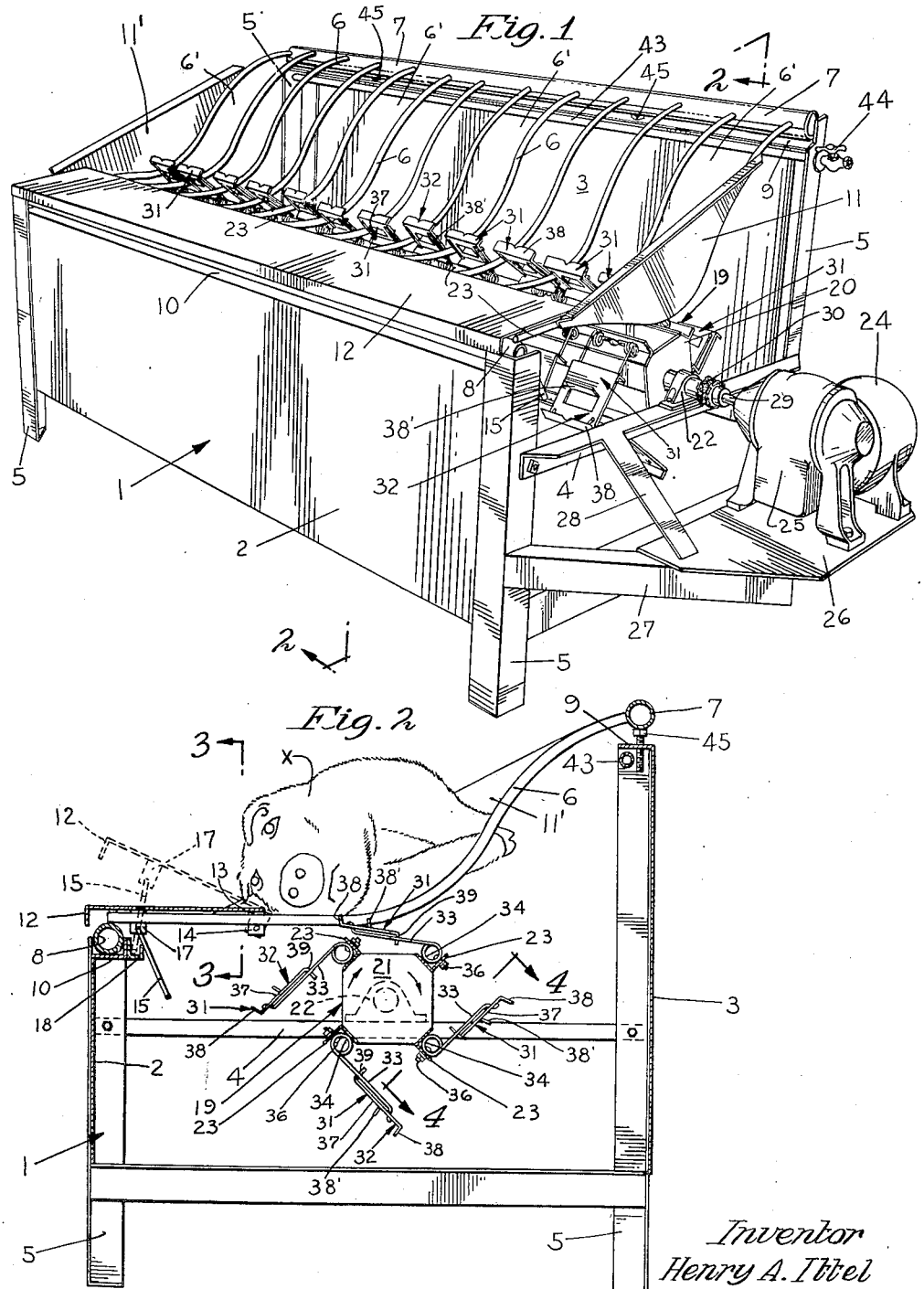
Inventor
Henry A. Ittel
By his Attorneys

Oct. 21, 1952     H. A. ITTEL     2,614,286
ANIMAL CARCASS DEHAIRING MACHINE
Original Filed Jan. 26, 1949     2 SHEETS—SHEET 2
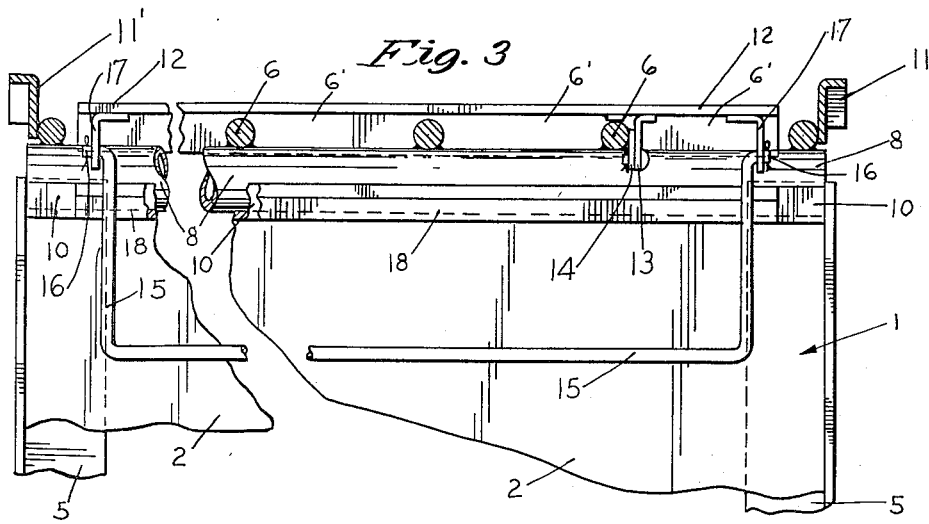
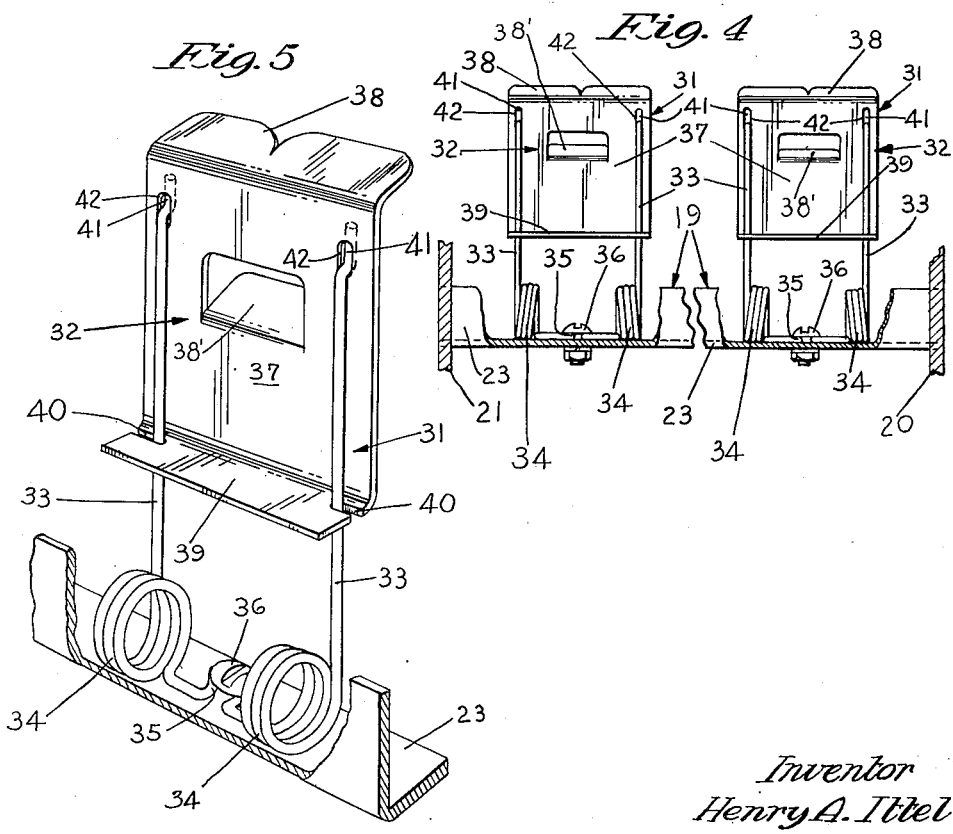
Inventor
Henry A. Ittel
By his Attorneys
Merchant & Merchant

UNITED STATES PATENT OFFICE 2,614,286

ANIMAL CARCASS DEHAIRING MACHINE

Henry A. Ittel, Howard Lake, Minn.

Original application January 26, 1949, Serial No. 72,969. Divided and this application July 7, 1950, Serial No. 172,540

4 Claims. (Cl. 17—16)

My present invention relates to improvements in devices or machines for dehairing animal carcasses, particularly hog carcasses, and is in the nature of a division of my copending application, filed January 26, 1949, under Serial No. 72,969, now Patent No. 2,517,880, Aug. 8, 1950.

Among the important objectives of the invention is the provision of a device or machine of the class described which is simple in construction, relatively low in cost, durable in use and highly efficient in operation.

In a more specific sense, it is an important objective of the instant invention to provide a novel combination of hog-receiving gambreling table and dehairing trough wall means, which is extremely inexpensive to construct and which greatly facilitates the handling of heavy hog carcasses and the transferring of the same from the dehairing trough or cradle to the gambreling table without any special equipment.

The machine of the instant invention is of the general character involving a transversely slotted carcass-supporting trough or cradle and a cooperating rotor located below the trough or cradle and carrying axially-spaced scraper blades which work through the slots in the cradle or trough. In prior art machines of the character under consideration, it has been customary to rigidly mount the slotted trough or cradle, and a great deal of trouble has resulted from the occasional interpositioning of a carcass leg between the cradle and rotating scraper blades; some such troubles being broken or mutilated carcass legs, and heavy straining occasionally breaking the parts of the rotor or other parts of the machine. In view of the above, a specific object of the instant invention is the provision, in a machine of the kind above described, of an improved structure whereby the possibility of damaging either the machine or the carcass being dehaired thereby, in the event of a leg becoming caught between a rotor blade or scraper and the slotted dehairing trough, will be greatly reduced. In accordance with the invention, I accomplish this important objective by mounting the slotted carcass-supporting cradle or trough with freedom for vertical movements with respect to the blade-equipped dehairing rotor. Hence, in my improved machine, whenever a leg or other protruding portion of a carcass being dehaired becomes caught between a rotating scraper blade, the trough will be free to be lifted upwardly until the blade has cleared the obstructing carcass leg or the like and thereby prevent damage to the leg or machine. It will be understood, of course, that the dehairing trough or cradle will return to its normal position as soon as the obstruction has been removed.

The above and still further objects and advantages of the invention will become apparent from the following specification, claims and appended drawings.

Referring with greater particularity to the drawings, wherein like characters indicate like parts throughout the several views:

Fig. 1 is a view in perspective of my novel dehairing machine;

Fig. 2 is a transverse section, taken on the line 2—2 of Fig. 1;

Fig. 3 is a fragmentary enlarged view, partly in section and partly in rear elevation, taken substantially on the line 3—3 of Fig. 2;

Fig. 4 is an enlarged fragmentary detail, partly in elevation and partly in section, taken on the line 4—4 of Fig. 2; and Fig. 5 is a greatly enlarged fragmentary perspective of one of the scraper blades of my device and mounting therefor.

Referring with greater particularity to the drawings, the numeral 1 indicates, in its entirety, a rectangular frame comprising front and rear walls 2 and 3 respectively, end bracing 4, and legs 5. It will be observed that the rear wall 3, preferably and as shown, is of a greater height than the front wall 2.

Extending transversely across the open top of the frame 1 in longitudinally-spaced relationship are a plurality of generally downwardly and forwardly-extending bars 6, which are depressed at their intermediate portions to collectively create a transversely-slotted hog-receiving trough or cradle. As shown, the upper and lower ends respectively of the bars 6 are rigidly secured to longitudinally-extending tubular members 7 and 8. The bars 6 and tubular members 7 and 8 define slots 6' which extend transversely of the trough. Tubular member 7 is gravity seated on an inturned portion 9 of the rear wall 3, whereas tubular member 8 is gravity seated in a retaining channel-forming portion 10 of the front wall 2. Also, preferably and as shown, the opposite ends of the cradle are closed by skirt-like members 11, 11'. Otherwise stated, the grid-like hog-supporting trough or cradle, comprising bar 6 and tubular members 7 and 8, is gravity seated on the frame with freedom for vertical or generally-upward and downward movements from its normal position, shown in the drawings; the frame channel 10 serving to retain the cradle-acting grid structure 6, 7 and 8 against lateral displacement. In view of this arrangement, it should be obvious that the grid-like trough or cradle may be quickly removed from the frame 1 or may be moved pivotally upwardly and forwardly on the axis of member 8 within retaining channel 10 for a purpose which will hereinafter become apparent.

Another highly important advantage of this floating type mounting of the cradle-acting grate structure is, of course, to prevent unnecessary mutilation of a carcass being dehaired or the placing of undue strain on the machine in the event a protruding part of a carcass, such as a leg, should become caught between the dehairing rotor, later to be described, and one of the bars 6. However, this important characteristic of the machine will be elaborated on later on herein.

One novel feature of my invention is the novel combination gambreling board and trough wall-forming plate which comprises a generally rectangular plate or board 12 which, adjacent its opposite ends, is provided with depending ears 13, which are pivotally secured to lugs 14 that project downwardly from adjacent bars 6. It will be observed that said pivotal connections are located forwardly of the depressed portions of rods 6 and radially outwardly of the field of rotation of a dehairing rotor hereinafter described. In its gambreling table-forming position, the plate 12 rests upon the generally horizontally-disposed forward ends of the bars 6, whereas, in its inclined position, as indicated in broken lines in Fig. 2, the plate 12 forms a wall section of the hog-receiving trough or cradle. It will be observed that a generally U-shaped supporting bracket 15 has outturned ends 16 which are journalled in ears 17 also depending from the underside of plate 12. As shown, particularly in Fig. 2, the intermediate portion of U-shaped supporting bracket 15 is adapted under action of gravity to become seated in a channel member 18 projecting laterally inwardly from the upper end of the front wall 2.

Underlying the hog-receiving cradle and in longitudinal alignment therewith is a dehairing rotor identified in its entirety by the numeral 19 and comprising a pair of disc-like end plates 20 and 21, one each journalled in bearings 22 on opposite end members 4 of the frame 1. A plurality, shown as being four in number, of circumferentially-spaced longitudinally-extending beams 23 have their opposite ends rigidly secured to the end plates 20 and 21 respectively for common rotation therewith (see Figs. 1 and 4). Preferably and as shown, beams 23 comprise lengths of angle iron and are secured to end plates 20 and 21 by welding or the like to provide a relatively light-weight rigid structure. For the purpose of imparting rotary movements to the element 19, I provide an electric motor or the like 24 and a reducing gear box 25, both mounted on a base plate 26 secured to one end of the frame 1 by supporting members 27 and 28. A drive shaft 29 is connected to reducing gears, not shown but contained within the gear box 25, and drives the rotary element 19 through a coupling 30 (see Fig. 1).

The rotor 19 is equipped with a plurality of longitudinally-spaced metallic scrapers 31, each comprising a scraper blade 32 mounted on a beam 23 in spaced relation thereto by means of a pair of spaced resilient arms 33. Arms 33 form the free ends of a pair of torsion springs made from a single length of spring wire or the like, the spaced coils 34 of which lie tangentially against adjacent sides of a said beam 23. The wire connecting the spaced coils 34 is formed to provide an anchoring loop 35 which is clamped to the beam 23 by means of a nut-equipped bolt 36 passing therethrough and one side wall of beam 23. Each scraper blade 32 is formed from a single sheet of material, preferably steel, providing a central body portion 37, scraping flanges 38 and 38' at the outer end and intermediate portions respectively of said body portion and projecting substantially at right angles thereto, and an anchoring flange 39 projecting from the inner end of the body portion 37 in the opposite direction of the scraper flanges 38 and 38'. It will be seen that rotor 19 rotates in a clockwise direction with respect to Fig. 2 and that the scrapers 31 project generally rearwardly of the direction of rotation of rotor 19. It will also be noted that the scraper flanges 38 and 38' extend substantially in the direction of rotation of rotor 19. The opposite sides of the anchoring lip 39 are provided with laterally outwardly-opening notches 40 that receive the intermediate portion of arms 33, which extend radially outwardly therethrough and terminate in laterally offset extreme end portions 41. Said offset ends 41 extend through apertures 42 at the outer end of the main body 37 adjacent the opposite side edges thereof. By this means, the scraper blades 32 are firmly supported in spaced relation to the beams 23 with a portion of each of said arms 33 overlying one face of the main body 37, and the offset ends overlying the opposite face thereof.

With respect particularly to Figs. 1 and 2, it will be seen that scrapers 31 are disposed on the beams 23 so that, upon rotation of rotor 19, the scraper blades 32 will project upwardly through the slots 6' defined by the cradle-forming bars 6. Under rotation of rotor 19, a hog carcass lying in the trough or cradle will be subjected to a beating and scraping action by the scraper flanges 38 and 38'. During this operation, the scraper blades 32 are depressed by the hog carcass against bias of the torsion springs or coils 34. Under each rotation of the rotor 19, the scraper flanges 38 and 38' of each blade 32 cut or scrape a swath of hair from the skin of the hog carcass. During this operation, it should be noted that the plate 12 is moved to its inclined trough wall-forming position, as indicated by dotted lines in Fig. 2. Frictional engagement of the cutter blades 38 with the skin of the hog carcass not only scrapes the hair therefrom but also tends to impart a rotary movement to the hog carcass so that very little manual effort is required to rotate said carcass so that all sides thereof may be scraped clean. During the scraping operation, the hog carcass is subjected to a spray of water emanating from a perforate spray pipe 43 extending longitudinally of the frame 1 adjacent the upper edge portion of rear wall 3. Pipe 43 is adapted to be coupled to a source of fluid under pressure not shown and is preferably provided with a shut-off valve 44. The water spray keeps the carcass in a moist condition and washes away hair that has been scraped loose from the skin of the hog carcass.

When the dehairing operation has been completed, the supporting bracket 15 is unseated from the channel member 18 and plate 12 allowed to assume its horizontal position upon the forward ends of bars 6. The hog carcass is then rolled upon the gambreling table provided by the flat plate 12 in its horizontal position and any remaining hair manually scraped therefrom.

The novel construction of scrapers 31 provides a rapid and easy removal of individual scraper blades 32 for resharpening or replacement. When it is desired to remove a scraper blade 32, it is but necessary to manually spread apart the intermediate portions of the flexible resilient arms 33 until they become unseated from the notches 40 of anchoring flange 39. With the arms 33 held in spread apart position, the scraper blade 32 is swung laterally away from engagement therewith to a point where anchoring flange 39 is entirely out of engagement with arms 33. The blade 32 may then be lifted from the offset end portions 41 of arms 33 and a new blade 32 inserted thereon. Removal or replacement of a blade 32 may be accomplished by the operator's reaching downwardly between the bars 6 to spread apart the intermediate portions of arms 33. However, access to the rotor 19 is greatly facilitated by pivotally tilting the cradle formed by the bars 6 and tubular elements 7 and 8 forwardly on the axis of the tubular member 8 in channel 10, or if desired, the cradle may be bodily removed from the frame 1.

In the event of breakage or damage to any one of the resilient arms 33 or coils 34, replacement thereof is effected by removal of its anchoring screw 36 and installation of a new pair of connected arms 33. This operation is quickly and easily accomplished without disturbing any other part of the rotor assembly.

The novel dehairing rotor and dehairing scrapers above described, are disclosed and broadly claimed in my earlier-filed copending application, Serial No. 72,969, now Patent No. 2,517,880, August 8, 1950.

As shown in Figs. 1 and 2, I provide means for adjusting the height of tubular member 7 with respect to the frame 1, comprising a pair of spaced adjusting screws 45 having threaded engagement with the inturned portion 9 of rear wall 3. Raising or lowering the tubular member 7 will cause the animal carcass X contained in the trough or cradle to be raised or lowered with respect to the scraper elements 31. By this means, the carcass may be subject to greater or lesser scraping pressure by the cutting blades 38 and 38' as desired by the operator. It should now be apparent that if, during a carcass dehairing operation, a protruding leg of the carcass should project through a slot 6' and become caught between the undersurface of a rod 6 and a revolving scraper blade 32, the upward pressure exerted on the revolving scraper blade upon the grid-like trough-forming cradle 6, 7 and 8 will cause the said grid-like cradle to move upwardly to permit passage of the said dehairing blade 32 without placing undue strain on any part of the machine and without producing unnecessary and undesirable mutilation of the effected leg. In practice, I have found that by virtue of this free floating type of mounting of the slotted hog-supporting cradle structure, the life of the machine, and particularly the rotating part thereof, is greatly extended as to compare to similar machines, wherein the slotted grate-like cradle structure is rigidly mounted on the frame.

It is important to note that each scraper blade 32, due to the resilient nature of the supporting arms 33, may be twisted out of a plane extending longitudinally of the frame 1. This ability to twist enables the cutter blade portion 38 to closely follow the contours of the hog carcass and thereby remove a maximum amount of hair therefrom in a minimum of time.

From the foregoing, it will be obvious that I have provided a hog dehairing machine which may be very easily cleaned and maintained in a sanitary condition. I have found that the prior art practice of using metallic scraper elements secured to arms of rubber, leather or the like, are difficult to keep clean, particularly after extended use.

My invention has been thoroughly tested and found to be adequate for the accomplishment of the objectives set forth; and, while I have shown a preferred embodiment of my device, it will be understood that the same is capable of modification without departure from the scope and spirit of the invention as defined in the claims.

What I claim is:

1. In a machine of the class described, a frame, an elongated generally horizontal animal-supporting cradle supported by the frame, said cradle having spaced transversely extending rotor scraper receiving slots, a frame-journalled dehairing rotor disposed below the cradle on an axis generally parallel to the cradle and having axially-spaced dehairing scrapers working through the slots in the cradle, the cradle being gravity seated on the frame with freedom for bodily upward movements with respect to the rotor, and means limiting lateral movements of the cradle with respect to the frame under limited upward movements thereof with respect to the frame.

2. In an animal carcass dehairing machine, an elongated generally horizontal trough structure for supporting an animal carcass while being dehaired, said trough structure comprising a main section defining the bottom and rear portions of the trough and a swingable auxiliary section defining the front wall of the trough, the bottom forming portion of the main trough section having longitudinally spaced transversely extending slots for reception of the scraper blades of a rotor journalled below the trough on an axis extending longitudinally thereof, the said auxiliary section of the trough being located largely outwardly and forwardly of the field of rotation of the scraper blades, means pivotally mounting the said auxiliary section of the trough for upward and downward swinging movements of its longitudinally extended front edge portion with respect to the main section of the trough about a generally horizontal axis adjacent its rear edge from an inclined position wherein the auxiliary section serves as a wall of the trough to a generally horizontal position wherein it serves as a gambreling table, and means for supporting said movable wall section in either of said positions.

3. The structure defined in claim 2 in which the inner longitudinal edge portion of the swingable auxiliary trough section is pivoted to the main trough section by said pivotal mounting means.

4. The structure defined in claim 2 in which the auxiliary trough section overlies the front portion of the main trough section and is pivoted thereto.

HENRY A. ITTEL.

REFERENCES CITED

The following references are of record in the file of this patent:

UNITED STATES PATENTS

| Number | Name | Date |
|---|---|---|
| 1,036,959 | Burk | Aug. 27, 1912 |
| 1,323,636 | Kohlhepp | Dec. 2, 1919 |
| 1,600,950 | Schmidt | Sept. 21, 1926 |
| 1,995,654 | Schmidt | Mar. 26, 1935 |